(12) United States Patent
Henry

(10) Patent No.: US 11,844,467 B2
(45) Date of Patent: Dec. 19, 2023

(54) REMOVABLE ONE-PIECE COOKWARE HANDLE

(71) Applicant: HENRY JOHNSON PTY LTD AS TRUSTEE FOR THE HENRY JOHNSON FAMILY TRUST, Kenmore Hills (AU)

(72) Inventor: Mark James Henry, Kenmore Hills (AU)

(73) Assignee: HENRY JOHNSON PTY LTD AS TRUSTEE FOR THE HENRY JOHNSON FAMILY TRUST, Kenmore Hills (AU)

( * ) Notice: Subject to any disclaimer, the term of this patent is extended or adjusted under 35 U.S.C. 154(b) by 320 days.

(21) Appl. No.: 17/346,253

(22) Filed: Jun. 13, 2021

(65) Prior Publication Data

US 2021/0393084 A1  Dec. 23, 2021

Related U.S. Application Data

(60) Provisional application No. 63/040,069, filed on Jun. 17, 2020.

(51) Int. Cl.
*A47J 45/10* (2006.01)
*B25B 9/02* (2006.01)

(52) U.S. Cl.
CPC ............... *A47J 45/10* (2013.01); *B25B 9/02* (2013.01)

(58) Field of Classification Search
CPC ............ A47J 45/10; A47J 45/071; B25B 9/02
See application file for complete search history.

(56) References Cited

U.S. PATENT DOCUMENTS

| 938,187 | A | | 10/1909 | Walker | |
|---|---|---|---|---|---|
| 1,991,307 | A | * | 2/1935 | Worden | A47J 45/10 7/128 |
| 4,206,853 | A | * | 6/1980 | Iten | A47J 45/072 220/759 |
| 7,036,859 | B1 | * | 5/2006 | Liao | A47J 45/10 294/31.1 |

(Continued)

FOREIGN PATENT DOCUMENTS

| CN | 205234347 U | 5/2016 |
|---|---|---|
| CN | 108451389 A | 8/2018 |
| JP | 2015097650 A | 5/2015 |

*Primary Examiner* — Stephen A Vu
(74) *Attorney, Agent, or Firm* — Epstein Drangel LLP; Robert L. Epstein

(57) ABSTRACT

The handle includes first and second spaced sets of prongs. Each of the prong sets has a first prong and a second prong spaced from the first prong a distance sufficient to receive the cookware rim therebetween. The prongs in each of the prong sets diverge as the prongs progress away from the cookware body. A locking mechanism is situated between the prong sets for engaging the cookware rim to removably secure the handle to the cookware. The locking mechanism includes a spring-loaded pin adapted to be received in an opening in the cookware rim. The pin is situated on the unattached end of a leaf spring prong extending from the body of the handle. The pin has an inclined surface which facilitates the insertion of the pin into the opening in the cookware rim to lock the handle to the cookware. The handle is formed of a single piece of material and may be sold in combination with the cookware or separately.

20 Claims, 9 Drawing Sheets

(56) References Cited

U.S. PATENT DOCUMENTS

| | | | | |
|---|---|---|---|---|
| 8,402,610 B2* | 3/2013 | Boes | ............... | A47J 45/071 |
| | | | | 16/110.1 |
| 9,215,524 B2* | 12/2015 | McKinnon | ............ | G10K 11/22 |
| 2010/0288783 A1* | 11/2010 | Park | ............... | A47J 45/071 |
| | | | | 220/759 |
| 2019/0174964 A1* | 6/2019 | Lilljedahl | ............ | A47J 45/10 |
| 2021/0113028 A1* | 4/2021 | Martin | ............... | A47J 45/07 |

* cited by examiner

REMOVABLE ONE-PIECE COOKWARE HANDLE

CROSS-REFERENCE TO RELATED APPLICATIONS

Priority is claimed on Provisional Patent Application No. 63/040,069, filed Jun. 17, 2020, the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to cookware and more particularly to a removable one-piece cookware handle.

2. Description of Prior Art Including Information Disclosed Under 37 CFR 1.97 and 1.98

A wide variety of removable and attachable handle systems for cookware have been used by cooks for many years. Such a handle can be designed to attach to many pan bodies which have identical mounting points, so each handle is interchangeable with each pan in a particular cookware range.

A conveniently removable handle can allow for many pan bodies to be stacked together, with only one, or several, common handles shared among all pan bodies, thus saving space. Durable and heat resistant solid one-piece pan bodies can be slid into ovens, then the (often in practice) less durable or low heat limit synthetic handles can be removed before closing the oven. When time comes to retrieve the hot pan, a cool handle can be quickly attached to remove the pan from the oven. Similar methods can be used with hot stovetops, and open fires on BBQs, campfires, etc.

The most common and commercially successful variations are assembled from many pieces, including plastic handles, pivot pins, springs, ratcheting multipart locking mechanisms, etc. While functioning well initially, these relatively complex mechanical systems with springs, pivots, and ratchets, etc. are prone to wear, heat damage, and failure. Some are made to universally clamp to the side walls of pots, relying on friction force from lockable jaws. Sudden failure of any of these mechanisms can lead to serious accidents when heavy pans and hot liquids/foods are involved.

Even the simplest of removable handles on the market today consist of separate parts for locking pins, with buttons and springs, and sometimes ratchets or rotating locks. Some are reasonably durable, but still subject to wear of moving parts over the long term. Many are made with plastics which are susceptible to heat damage, cracking, and are not preferred by consumers with a dislike for plastics in the environment.

Accordingly, there exists an opportunity in the market for a mechanically simpler, stronger, safer, more reliable and more durable removable/attachable handle. A handle made from a single piece of durable metal could be an optimal solution, if a positive location locking mechanism could be incorporated without the need for separate pieces.

BRIEF SUMMARY OF THE INVENTION

The removable handle of the invention includes first and second spaced sets of prongs. Each of the prong sets has a first prong and a second prong spaced from the first prong a distance sufficient to receive the cookware rim therebetween. A locking mechanism is situated between the prong sets for engaging the cookware rim to removably secure the handle to the cookware.

The handle has a body from which the prongs of the prong sets extend. The prongs in each of the prong sets diverge as the prongs progress away from the body.

The handle has a locking mechanism including a spring-loaded pin adapted to be received in an opening in the cookware rim. Preferably, the pin is situated proximate to the unattached end of a leaf spring extending from the body of the handle. The unattached end of the leaf spring has a bottom surface which is lower than the prongs of the prong sets.

The pin has an inclined surface which facilitates the insertion of the pin into the opening in the cookware rim to lock the handle to the cookware.

The first and second prongs in each prong set receive the cookware rim with minimal clearance.

The handle has a part which limits the movement of the handle toward the cookware as the cookware rim is received between the first and second prongs of the prong sets.

The handle is preferably formed of a single piece of material.

The handle may be sold in combination with the cookware or separately.

BRIEF DESCRIPTION OF THE SEVERAL VIEWS OF DRAWINGS

To these and to such other objects that may hereinafter appear, the present invention relates to a removable one-piece cookware handle as described in detail in the following specification and recited in the annexed claims, taken together with the accompanying drawings in which:

DETAILED DESCRIPTION OF THE INVENTION

Figure 1:
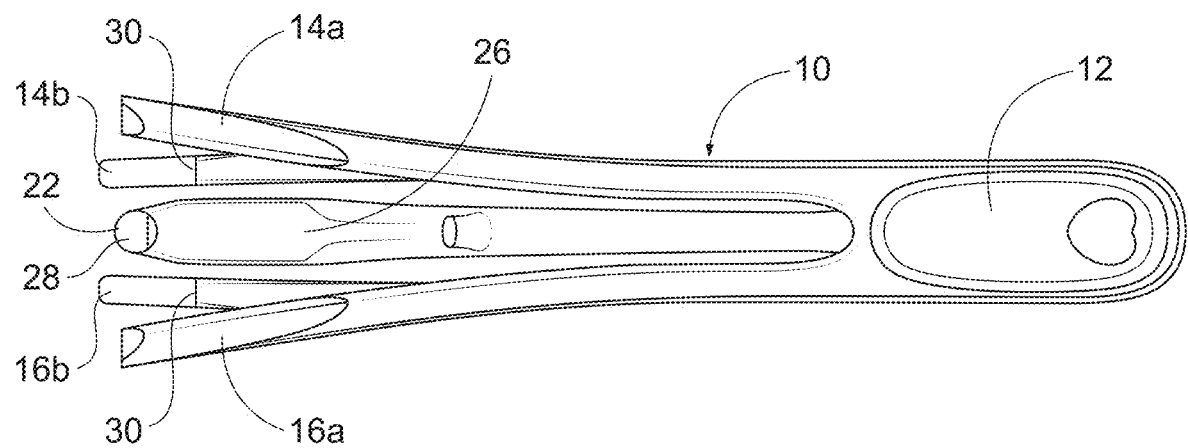
FIG. 1 is a top plan view of the removeable one-piece cookware handle of the present invention.
Figure 2:
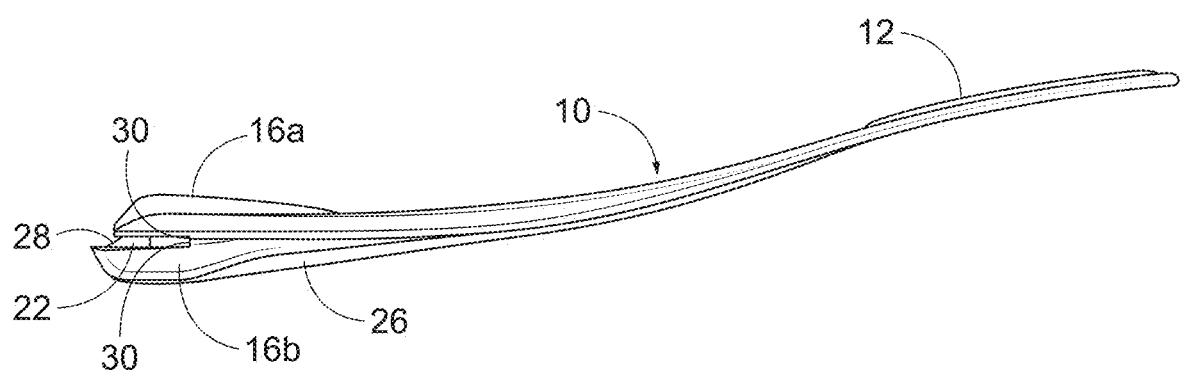
FIG. 2 is a side elevation view of the handle.
Figure 3:
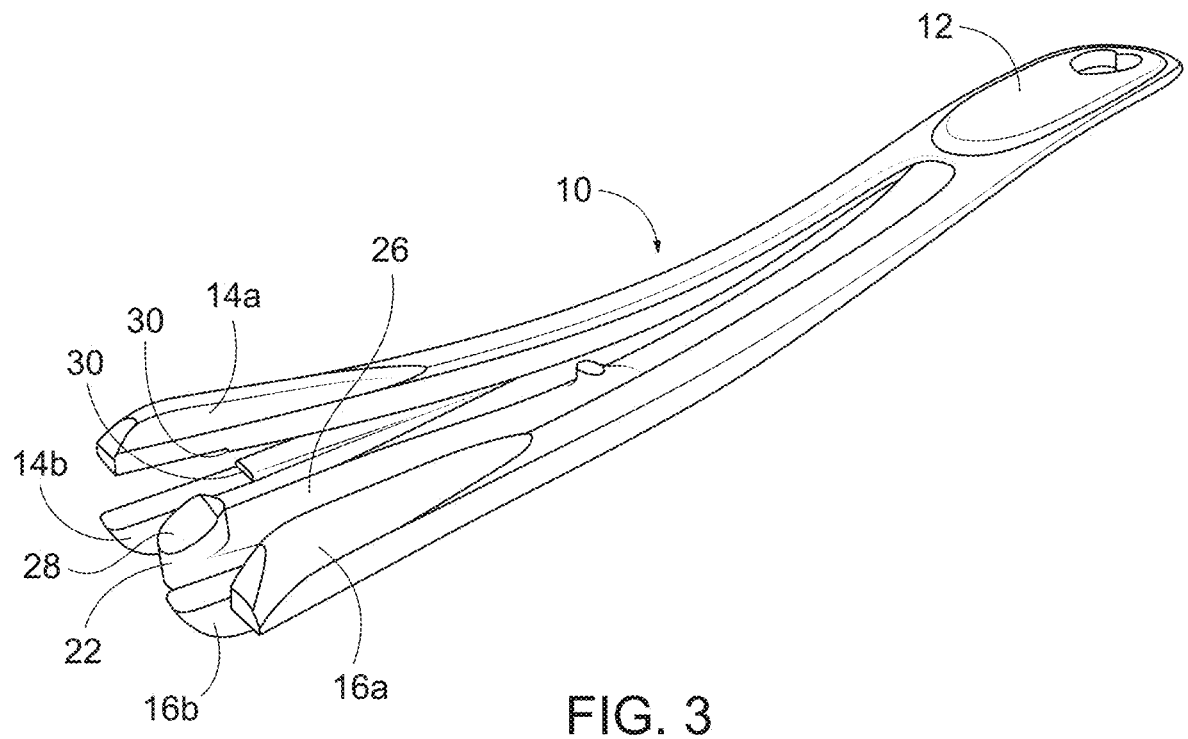
FIG. 3 is a perspective view of the handle.
Figure 4:
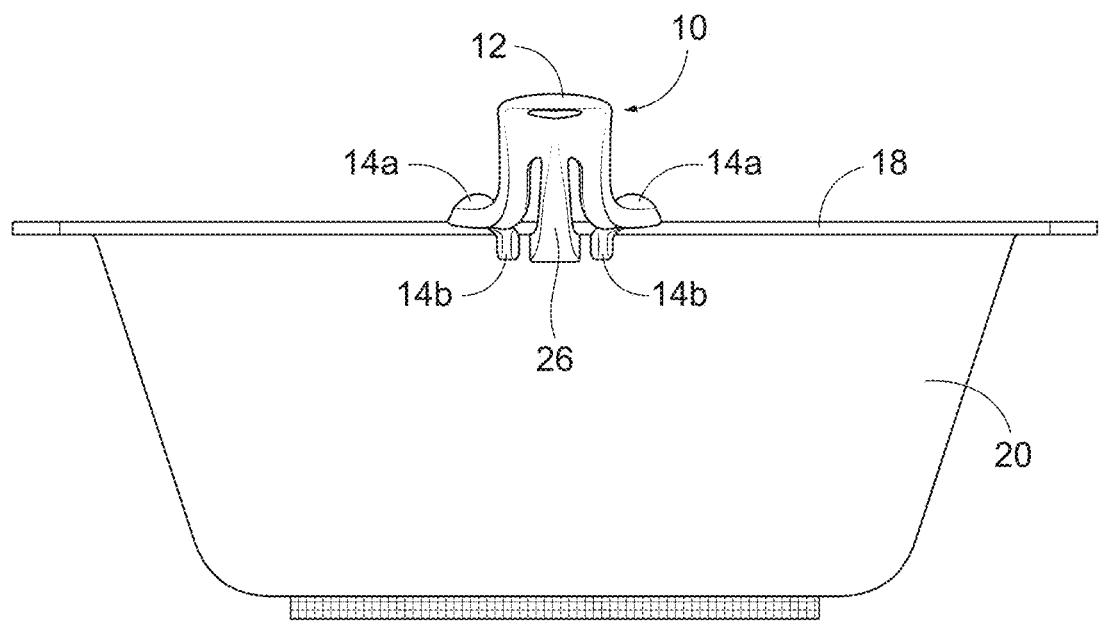
FIG. 4 is an elevation view of a cookware pan with the handle attached.

FIG. 1 shows a top plan view of the removeable one-piece cookware handle of the present invention. FIG. 2 shows a side elevation view of the handle. FIG. 3 shows a perspective view of the handle. FIG. 4 shows an elevation view of a cookware pan with the handle attached.

This one-piece metal handle, generally designated 10, includes a body portion 12. Expending from body portion 12 are two sets of prongs. Each set of prongs includes comprises a top prong 14a, 16a and a bottom prong 14b, 16b. The wide rim 18 of a cookware pan 20 is received between the top prong and the bottom prong of each prong set 14, 16 to attach handle 10 to pan 20, as seen in FIG. 4.

The top and bottom prongs in each prong set diverge as the prongs progress away from handle body portion 12. That allows the rim 18 of the pan to be guided into and be received between the prongs, ideally with minimal clearance, as the handle is moved toward the pan.

The weight of the cookware pan causes the rim to wedge between the prongs in each prong sets to easily carry the weight of the pan and food (assuming sufficient strength in pan rim and prongs) in any pan position close to horizontal. The friction generated between the prongs and pan rim is significant, and sufficient to retain a secure engagement between pan rim and handle in a range of angles from horizontal pan to moderately inclined pan.

However, as the pan is inclined away from horizontal, for example while pouring or scraping food contents out, there can arrive a point where the weight of the pan in the vertical plane will exceed the friction generated with the prongs, and gravity will cause the two elements to separate. This would lead to the dangerous situation of a falling pan, potentially hot and containing a hot and heavy load of food or liquid, similar to the occasional results of sudden failure of conventional removable handles.

Such problems could arise when the pan is rotated toward 90 degrees from horizontal, for example when tipping the water or food from a pan into a sink, plate, or other vessel. In the horizontal resting position, there is so much friction generated by the weight of the pan 'wedging' the rim between the handle prongs that the pan would not detach from the handle in practice.

As the pan and handle are rotated, there arrives a certain angle from horizontal where the weight of the pan and food overcomes the friction generated between rim and prongs, and the rim would slide out of the prongs, causing the pan (and its contents) to fall. When hot and heavy weights are involved in cooking, such a failure is to be avoided at all times.

To prevent the potential danger of accidental detachments of the pan from the handle, a locking mechanism is provided including a short, spring-loaded pin 22. Pin 22 is adapted to be received in an opening 24 in rim 18 of the cookware pan. FIGS. 5-8 illustrate in greater detail.

Figure 5:
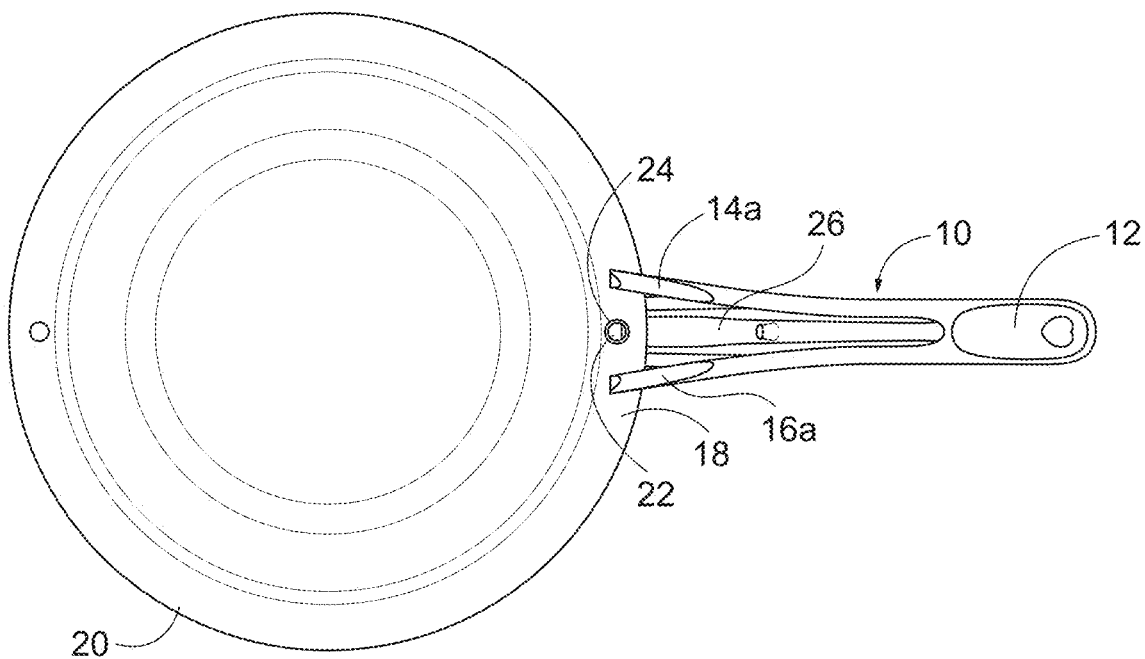
FIG. 5 is a top plan view of the pan and the handle of FIG. 4.
Figure 6:
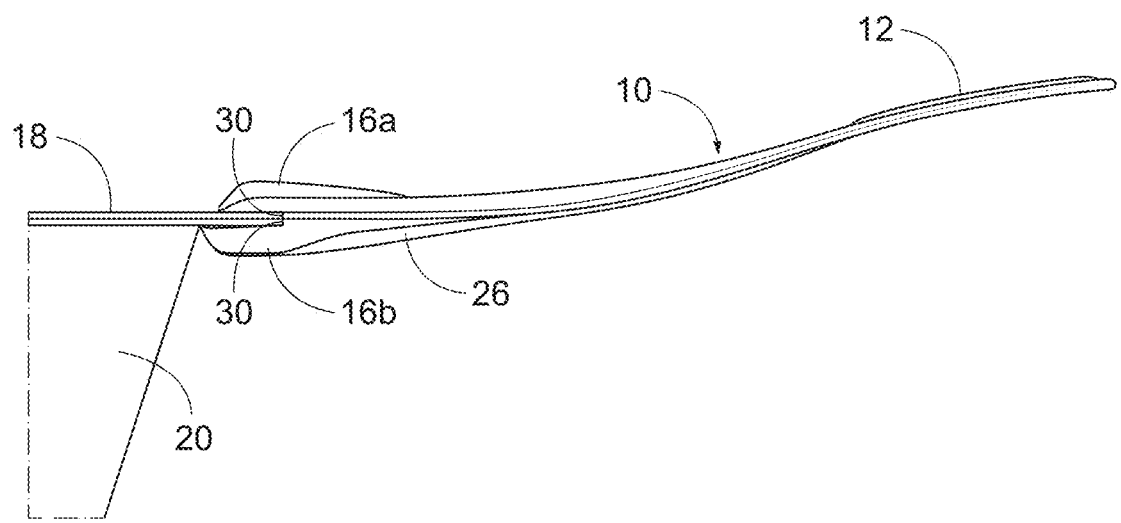
FIG. 6 is a side view of a portion of the pan and the handle of FIG. 5.
Figure 7:
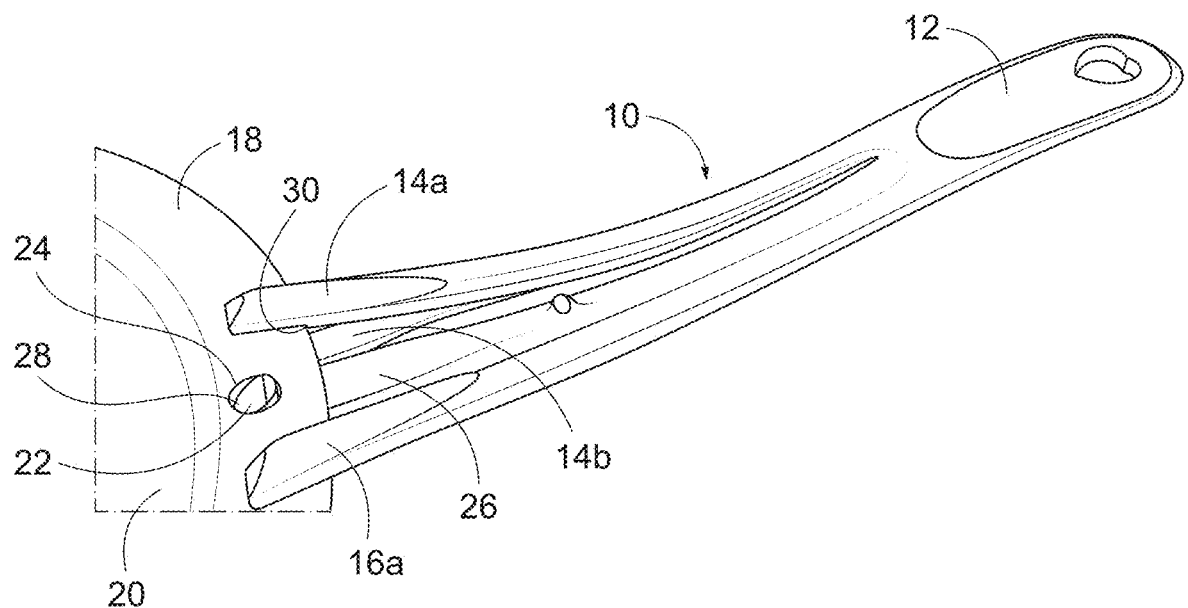
FIG. 7 is a perspective view of a portion of the pan and the handle of FIG. 5.
Figure 8:
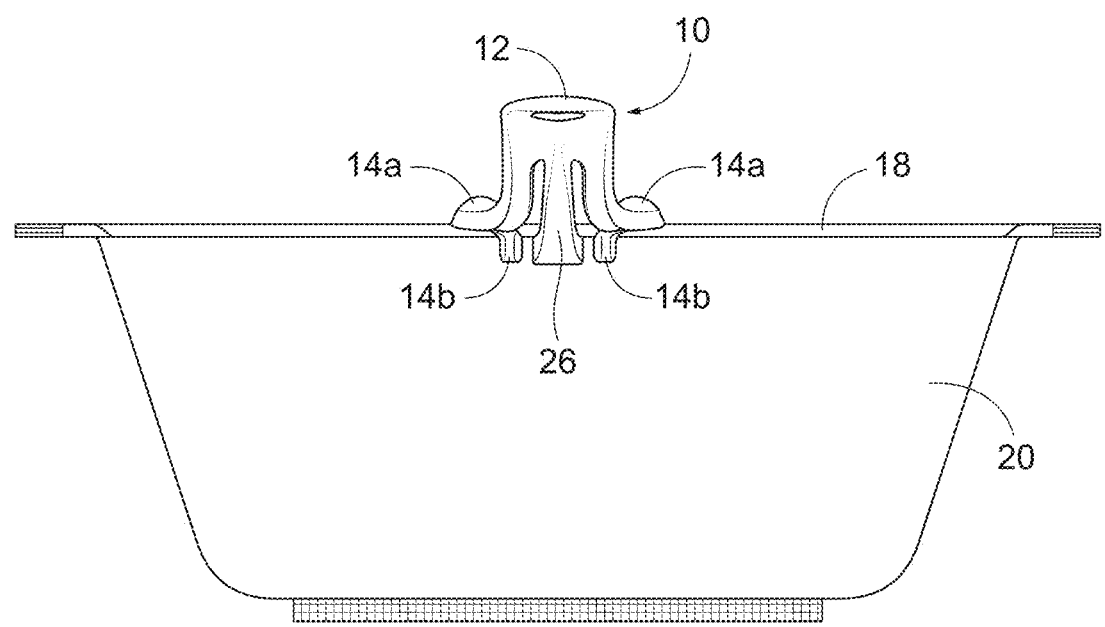
FIG. 8 is an elevation view of a pan with the handle of FIG. 5.

FIG. 5 shows a top plan view of the pan and attached handle of FIG. 4. FIG. 6 shows a side view of a portion of the pan and attached handle of FIG. 5. FIG. 7 shows a perspective view of a portion of the pan and the attached handle of FIG. 5. FIG. 8 is an elevation view of a cookware pan with the handle of FIG. 5.

In its preferred embodiment, pin 22 is mounted on and extends from the top surface of a third prong 26. Prong 26 extends from handle body portion 12 into the space between the prong sets 14a, 14b and 16a, 16b. Prong 26 takes the form of a long central leaf spring which carries the integral locking pin on the unattached end. The locking pin is inserted into an opening 24 in the rim of the pan, thereby locking the handle in place so that it cannot be accidentally separated from the pan rim.

Figure 9:
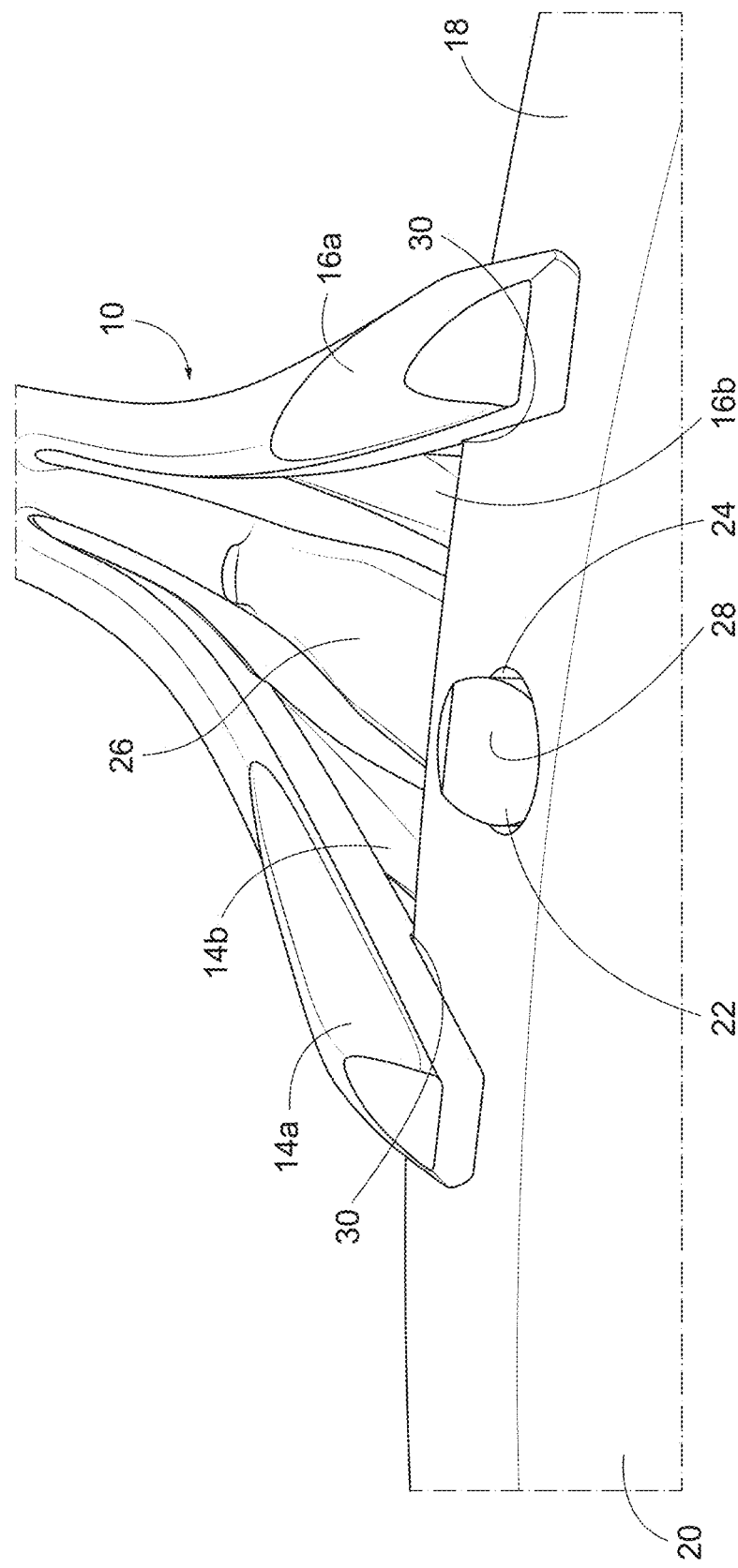
FIG. 9 is an enlarged perspective view of a portion of the pan and a portion of the handle of FIG. 5.
Figure 10:
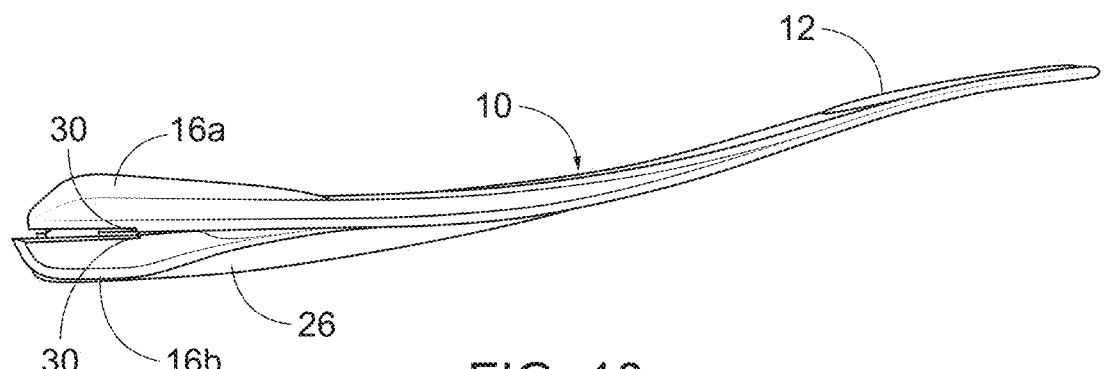
FIG. 10 is a side view of the handle prior to attachment to a pan.

Pin 22 is spring-loaded toward the under surface of the rim. It functions as a detent. As illustrated in FIG. 9, the top surface of pin 22 is inclined such that the edge of the rim causes the pin to move downwardly away from the under surface of the rim and out of the path of movement of the rim as the handle is moved toward the pan. Once the pin is aligned with the rim opening 24, it provides an audible click when it is fully received in the rim opening.

FIG. 9 shows that the top of the pin extends above the surface of the rim in its locked position. In the locked position, the pin is easily visible to the user.

The locking pin 22 can only be disengaged by purposefully releasing the grip of the handle and pressing down on the leaf spring prong 26 hard enough to depress the leaf spring prong 26 far enough to allow the pin to fully clear the bottom of the pan rim opening 24.

Preferably, the bottom surface of the long leaf spring prong 26 is lower than the main handle body on each side, so when the handle is used to lift the pan, the weight of the pan and handle is first transferred to the hand of the user via the long leaf spring prong, not the main handle body, such that the upward pressure of the hand on the leaf spring prong automatically helps retain the pin inside the pan rim opening.

Figure 11:
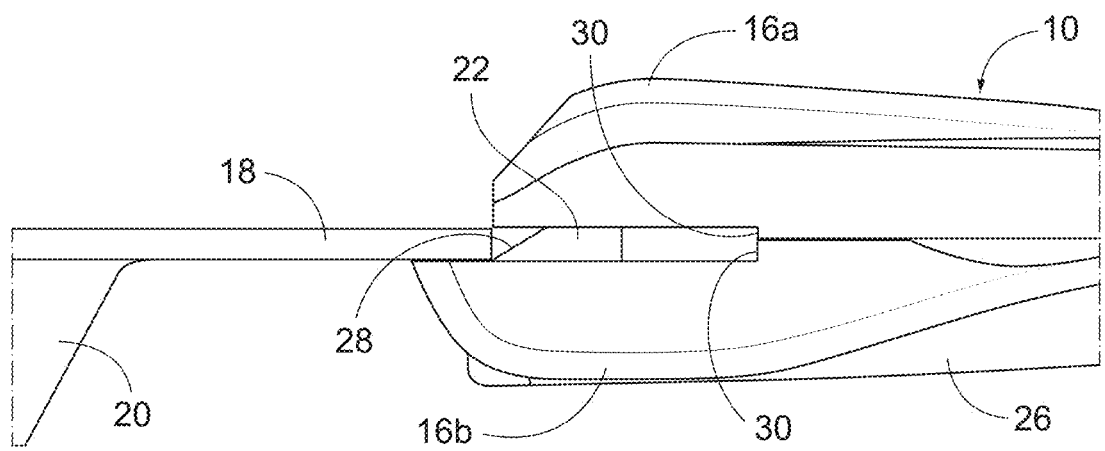
FIG. 11 illustrates the handle aligned with the pan prior to engagement with the pan.
Figure 12:
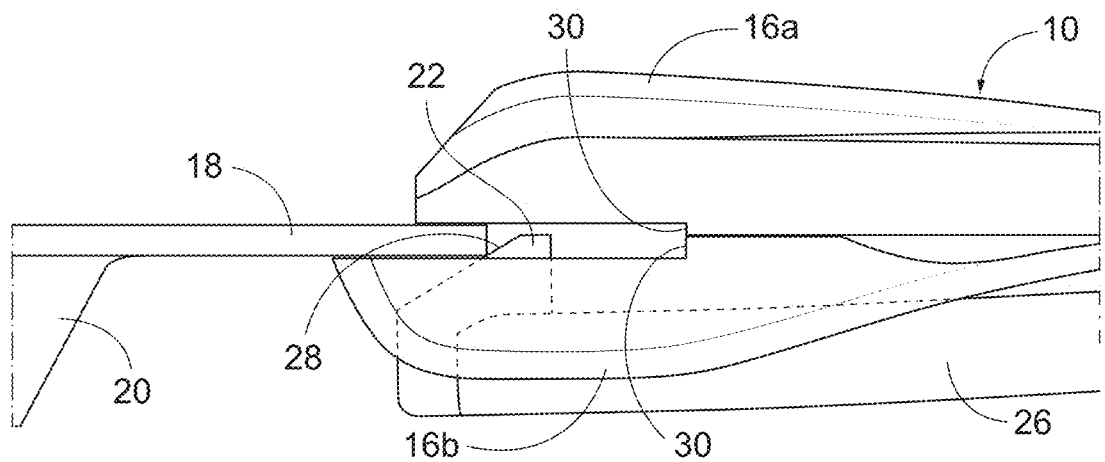
FIG. 12 illustrates the edge of the pan opening contacting the inclined surface of the locking pin as the handle is moved toward the pan.
Figure 13:
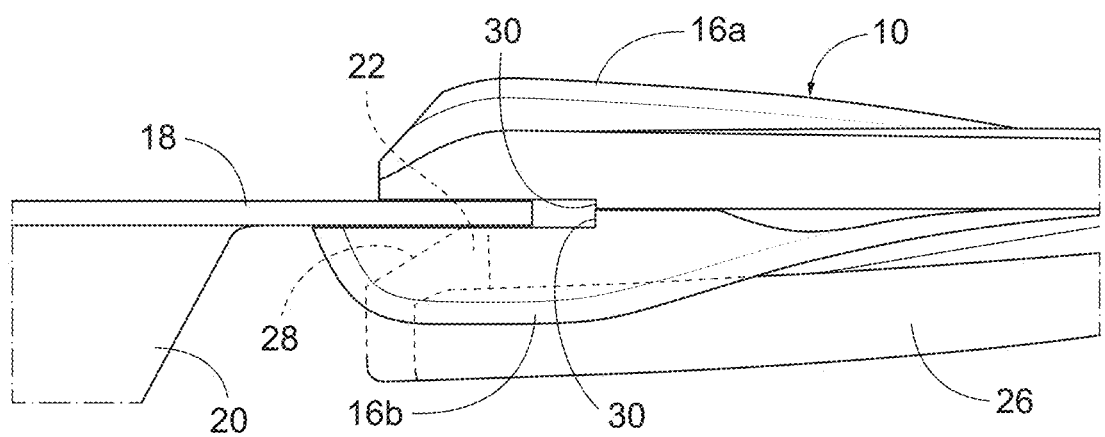
FIG. 13 illustrates the pan rim depressing the locking pin as the handle is moved further toward the pan.
Figure 14:
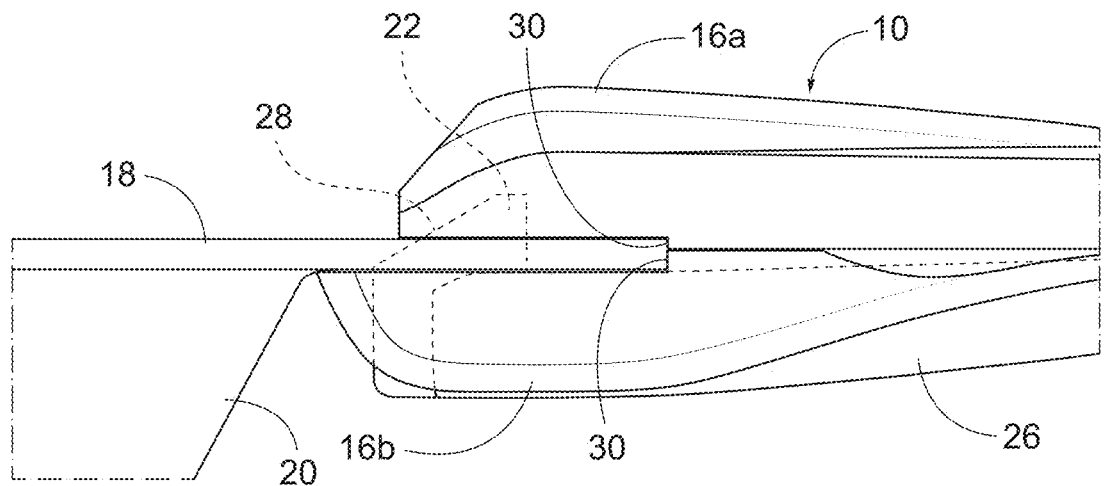
FIG. 14 illustrates the position of the locking pin in the pan rim opening when the handle is locked in its final position.
Figure 15:
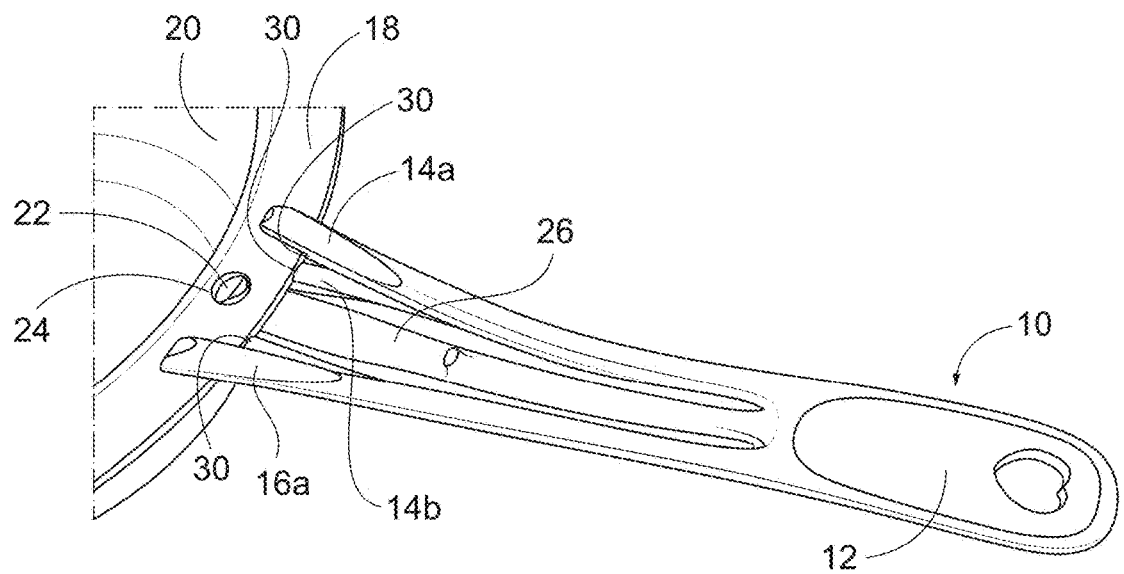
FIG. 15 shows a portion of the pan and the handle of FIG. 14.
Figure 16:
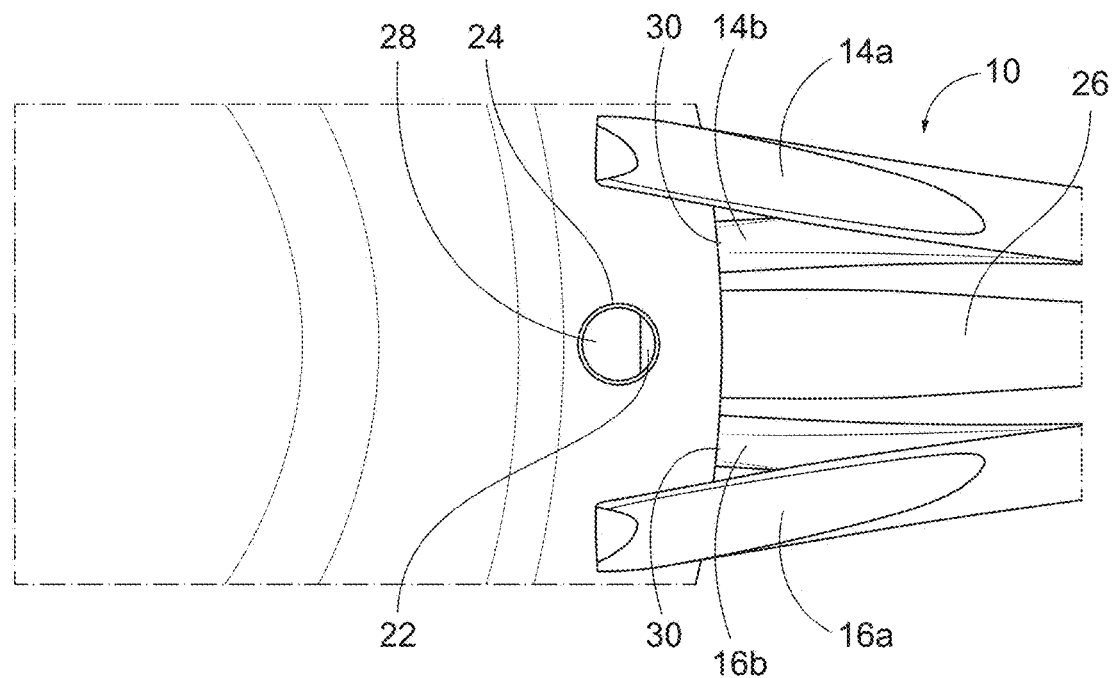
FIG. 16 is a top plane view of a portion of the pan and a portion of the handle of FIG. 14.

FIGS. 11-16 illustrate how the handle prongs engage the pan rim. As seen in FIG. 11, the handle is aligned with the pan prior to engagement. Only a minimal clearance is present between the rim and slot formed by the prongs. In practice, chamfers on the leading edges of the prongs help with alignment.

As the handle is pushed inward toward the pan and thus the rim opening, the rim 18 of the pan contacts the inclined top surface 28 of the locking pin, see FIG. 11. That causes the pin to move downward, see FIG. 12, and under the bottom surface of the rim, see FIG. 13.

As the handle is moved further toward the pan, pin 22 aligns with and enters opening 24 in rim 18. In that position, the leaf spring prong causes the pin to snap into full engagement with the aligned rim opening, audibly and visibly, see FIGS. 14, 15 and 16. The handle is prevented from moving beyond that position toward the pan by shoulders 30 on the top surface of prong 14b and prong 16b of the handle, which are engaged by the leading edge of the pan rim.

Figure 17:
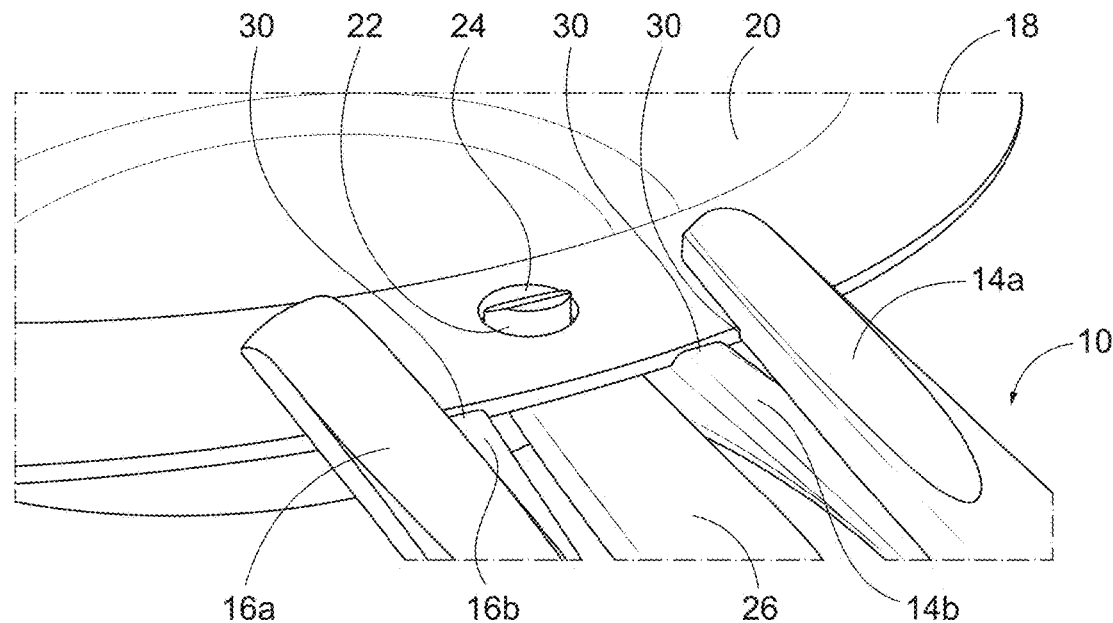
FIG. 17 is a perspective view of a portion of the pan and a portion of the handle of FIG. 15.

As shown in FIG. 17, the pin can be made much longer than the thickness of the pan rim such that it protrudes well above the surface of the rim in the locked position. The locking mechanism eliminates the risk of the pin disengaging from the opening in the event that the pan is tipped sideways and friction force between the handle and rim is lost.

When the pan approaches vertical and friction is lost, the pan rim is constrained to rotate around the locking pin located securely in the rim opening. This could create another unsafe condition if the pan could continue this rotation. This situation is avoided by providing 'backstop' features into the end of the slot formed by the prongs. A step in the casting or any solid feature positioned to contact the pan rim before it can move too far will prevent any significant rotation.

Figure 18:
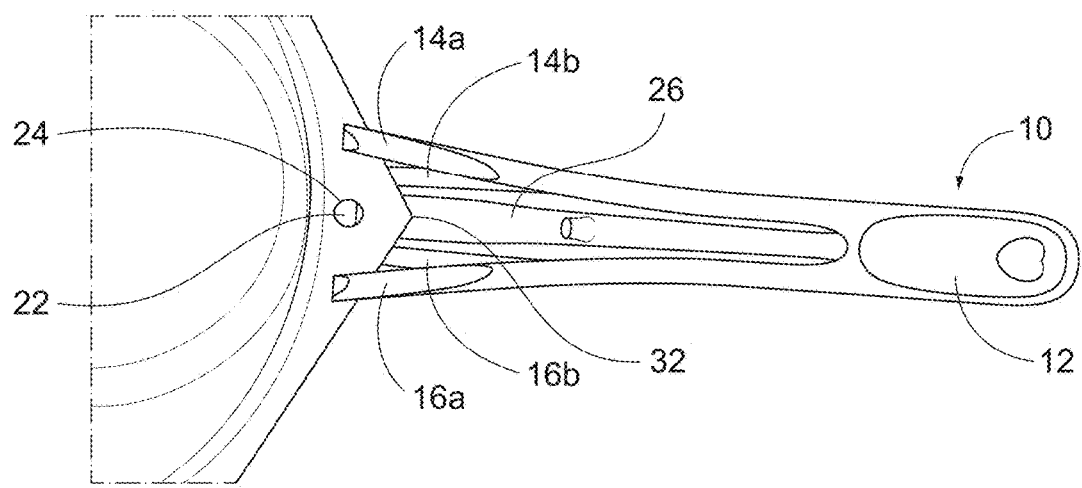
FIG. 18 is a perspective view of a portion of the pan and a portion of the handle of FIG. 16.

A round rim of large diameter will successfully lock against the backstop of the prongs as described above, because the diameter of rotation around the pin is much smaller than the diameter of the pan rim. However, for more positive engagement to resist rotation forces, other pan rim shapes are possible, from slots and notches to angled rims like the point of a polygon. One such possibility is shown in FIG. 18, whereby the 60 degree corner 32 of a hexagon shaped rim engages with matching 60 degree steps, pins, or any other solid feature in the prongs to resist rotation of the pan rim opening around the locking pin.

The rim can also be formed into a curved or inclined plane relative to the horizontal, which may add some benefits in strengthening the rim where the handle transfers the lifting force to the pan. A rim that is bent up on two sides, and down on the perpendicular sides might have advantages, though a flat rim works fine.

Ideally, this solid metal handle described herein is very simply cast (sand or investment) in one single piece using a simple two-part mold, in any suitable metal, such as steel, iron, stainless steel, copper alloys, etc., though it could also be 3D printed in the same form, or it could be pressed from sheet with some obvious minor design modifications to suit that process. Structurally, the material would need to be strong enough to safely carry the weight of the pan and food. It would need to possess enough internal spring to ensure good long-term repeatable function of the long central leaf spring prong as described.

If the casting, printing, or pressing method is accurate enough, there would be no need for any further machining. However, to ensure a closer fit between the prongs of the handle and the pan rim, the prongs could be slotted in a milling machine, or similar tool, to reduce the tolerance and reduce the "play" between handle and rim. A very close fit is not critical to the invention, with the security of the described pin and hole locking mechanism, though customers would perceive a higher quality, and higher strength, if there was very little "play" between the two elements.

Though initially thought impossible, a solid one-piece handle with reliable and simple locking mechanism was the design goal. Through many iterations the design described herein proved to be the simplest, strongest and most durable design conceivable.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

The invention claimed is:

1. A removable handle for cookware having a rim, said handle comprising first and second spaced sets of prongs, each of said prong sets comprising a first prong and a second prong spaced from said first prong a distance sufficient to receive the cookware rim therebetween and a locking mechanism situated between said prong sets for engaging the cookware rim to removably secure the handle to the cookware, wherein said locking mechanism comprises a spring-loaded pin and wherein said spring comprises a long leaf spring.

2. A removable handle for cookware having a rim, said handle comprising first and second spaced sets of prongs, each of said prong sets comprising a first prong and a second prong spaced from said first prong a distance sufficient to receive the cookware rim therebetween and a locking mechanism situated between said prong sets for engaging the cookware rim to removably secure the handle to the cookware, wherein the cookware rim has an opening, said locking mechanism comprises a pin adapted to be received in said opening in the cookware rim, wherein said pin is situated on a spring, wherein said spring has an unattached end and said pin is situated proximate the unattached end of said spring.

3. A removable handle for cookware having a rim, said handle comprising first and second spaced sets of prongs, each of said prong sets comprising a first prong and a second prong spaced from said first prong a distance sufficient to receive the cookware rim therebetween and a locking mechanism situated between said prong sets for engaging the cookware rim to removably secure the handle to the cookware, wherein said locking mechanism comprises a leaf spring prong having a bottom surface lower than said prongs in each of said prong sets.

4. In combination, cookware having a rim and a removable handle for said cookware, said handle comprising first and second spaced sets of prongs, each of said prong sets comprising a first prong and a second prong spaced from said first prong a distance sufficient to receive said cookware rim therebetween and a locking mechanism situated between said prong sets for engaging the cookware rim to removably secure said handle to said cookware handle, wherein said locking mechanism comprises a spring-loaded pin and spring comprised a long leaf spring.

5. In combination, cookware having a rim and a removable handle for said cookware, said handle comprising first and second spaced sets of prongs, each of said prong sets comprising a first prong and a second prong spaced from said first prong a distance sufficient to receive said cookware rim therebetween and a locking mechanism situated between said prong sets for engaging the cookware rim to removably secure said handle to said cookware, wherein said cookware rim has an opening and said locking mechanism comprises a pin adapted to be received in said opening in said cookware rim, wherein said pin is situated on a spring, wherein said spring has an unattached end and said pin is situated proximate said unattached end of said spring.

6. In combination, cookware having a rim and a removable handle for said cookware, said handle comprising first and second spaced sets of prongs, each of said prong sets comprising a first prong and a second prong spaced from said first prong a distance sufficient to receive said cookware rim therebetween and a locking mechanism situated between said prong sets for engaging the cookware rim to removably secure said handle to said cookware, wherein said locking mechanism comprises a leaf spring having a bottom surface lower than said prongs.

7. A removeable one-piece cookware handle for use with a pan having a rim with an opening, said handle comprising a body portion and first and second spaced sets of prongs extending from said body portion in the same general direction, each of said set of prongs comprising a top prong having an end and a bottom prong having an end, said top and bottom prong ends gradually diverging from each other to guide said rim of said pan therebetween as the pan is engaged by said handle, and a leaf spring prong extending from said body portion between said first and second prong sets, said leaf spring prong comprising a surface and a pin extending from said surface, said pin being situated to lodge in said pan rim opening as said pan rim is received between said top and bottom prongs in each of said first and second spaced prong sets to secure said handle on said pan.

8. The handle of claim 7 wherein said pin comprises an inclined surface adapted to move said leaf spring prong and pin downwardly away from and out of the path of movement of said rim, as said handle is moved toward said pan.

9. The handle of claim 7 wherein at least a portion of said leaf spring prong is situated below said body portion.

10. The handle of claim 7 wherein at least a portion of said top prong of at least one of that prong sets is curved outwardly relative to said bottom prong of said prong set.

11. The handle of claim 7 wherein at least one of said bottom prongs of at least one of said prong sets comprises a surface with an edge which limits the distance in which the pan rim can be received between said prongs of said at least one of said prong sets.

12. The handle of claim 7 wherein said pan rim has a thickness and said pin is longer than said pan rim thickness such that at least a portion of said pin extends above said pan rim when said pin is received in said pan rim opening.

13. The handle of claim 7 wherein said pan rim is hexagon shaped and includes a corner.

14. In combination, a pan having a rim with an opening and a removeable one-piece cookware handle for use with said pan, said handle comprising a body portion and first and second spaced sets of prongs extending from said body portion in the same general direction, each of said set of prongs comprising a top prong having an end and a bottom prong having an end, said top and bottom prong ends gradually diverging from each other to guide said rim of said pan therebetween as said pan is engaged by said handle, and a leaf spring prong extending from said body portion of said handle between said first and second prong sets, said leaf spring prong comprising a surface and a pin extending from said pin surface, said pin being situated to lodge in said pan rim opening as said pan rim is received between said top and bottom prongs in each of said first and second spaced prong sets to secure said handle on said pan.

15. The combination of claim 14 wherein said pin comprises an inclined surface adapted to move said leaf spring prong and pin downwardly away from and out of the path of movement of said rim, as said handle is moved toward said pan.

16. The combination of claim 14 wherein at least a portion of said leaf spring prong is situated below said body portion.

17. The combination of claim 14 wherein at least a portion of said top prong of at least one of that prong sets is curved outwardly relative to said bottom prong of said prong set.

18. The combination of claim 14 wherein at least one of said bottom prongs of at least one of said prong sets comprises a surface with an edge which limits the distance in which the pan rim can be received between said prongs of said at least one of said prong sets.

19. The combination of claim 14 wherein said pan rim has a thickness and said pin is longer than said pan rim thickness such that at least a portion of said pin extends above said pan rim when said pin is received in said pan rim opening.

20. The combination of claim 14 wherein said pan rim is hexagon shaped and includes a corner.

\* \* \* \* \*